Figure 1:
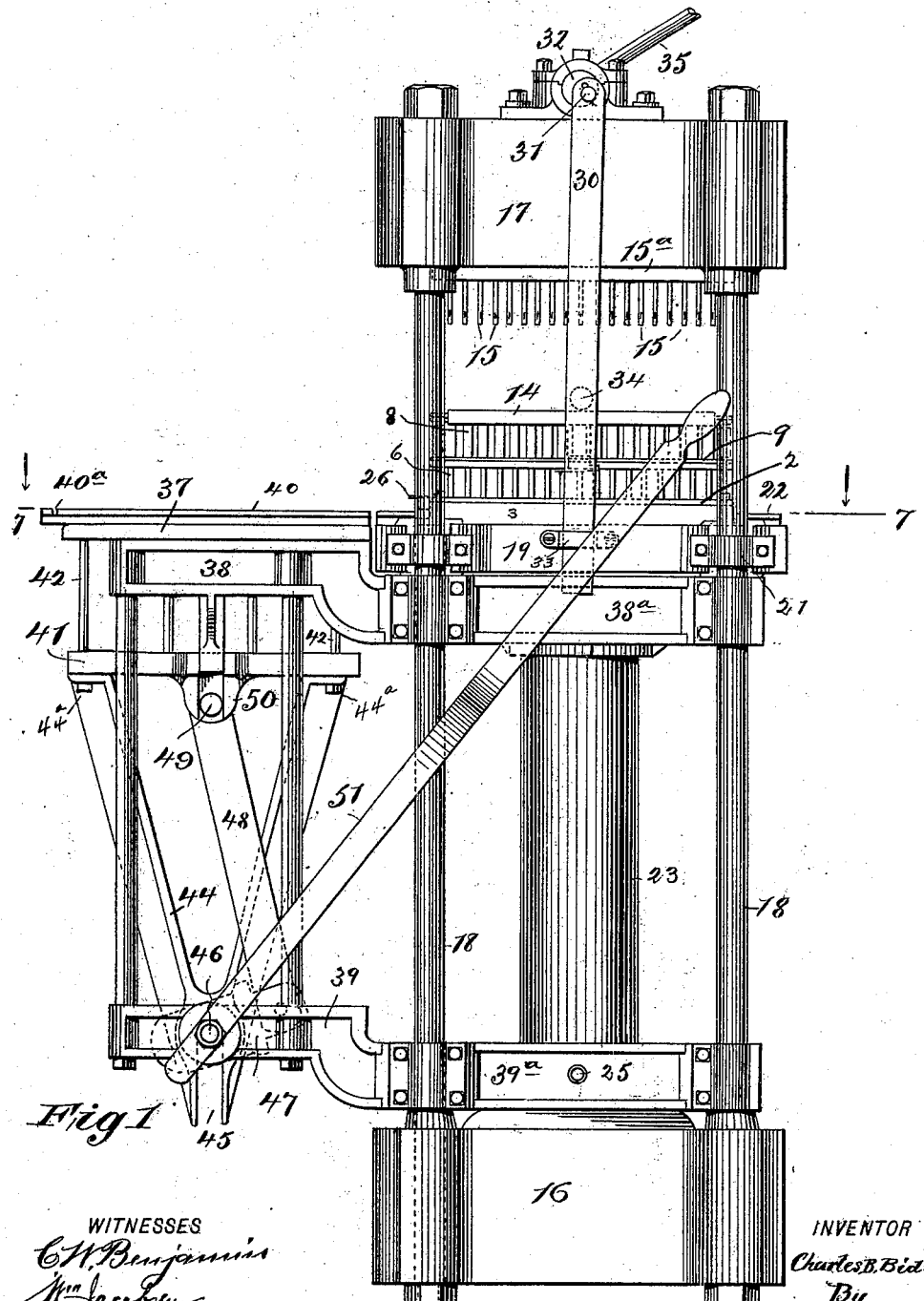

No. 691,103. Patented Jan. 14, 1902.
C. B. BIDWELL.
MACHINE FOR LOADING FIRE CRACKERS.
(Application filed May 27, 1898.)

(No Model.) 8 Sheets—Sheet 2.

WITNESSES
C. W. Benjamin
Wm Jacobsen

INVENTOR
Charles B. Bidwell
BY
Joseph L. Levy
ATTORNEY

No. 691,103. Patented Jan. 14, 1902.
C. B. BIDWELL.
MACHINE FOR LOADING FIRE CRACKERS.
(Application filed May 27, 1898.)
(No Model.) 8 Sheets—Sheet 3.

WITNESSES
INVENTOR
Charles B. Bidwell
BY
ATTORNEY

No. 691,103. Patented Jan. 14, 1902.
C. B. BIDWELL.
MACHINE FOR LOADING FIRE CRACKERS.
(Application filed May 27, 1898.)

(No Model.) 8 Sheets—Sheet 4.

WITNESSES
INVENTOR
Charles B. Bidwell,
BY
ATTORNEY

No. 691,103. Patented Jan. 14, 1902.
C. B. BIDWELL.
MACHINE FOR LOADING FIRE CRACKERS.
(Application filed May 27, 1898.)

(No Model.) 8 Sheets—Sheet 6.

WITNESSES
C. W. Benjamin
Wm. Jacobsen

INVENTOR
Charles B. Bidwell.
BY
Joseph R. Levy
ATTORNEY

No. 691,103. Patented Jan. 14, 1902.
C. B. BIDWELL.
MACHINE FOR LOADING FIRE CRACKERS.
(Application filed May 27, 1898.)
(No Model.) 8 Sheets—Sheet 7.
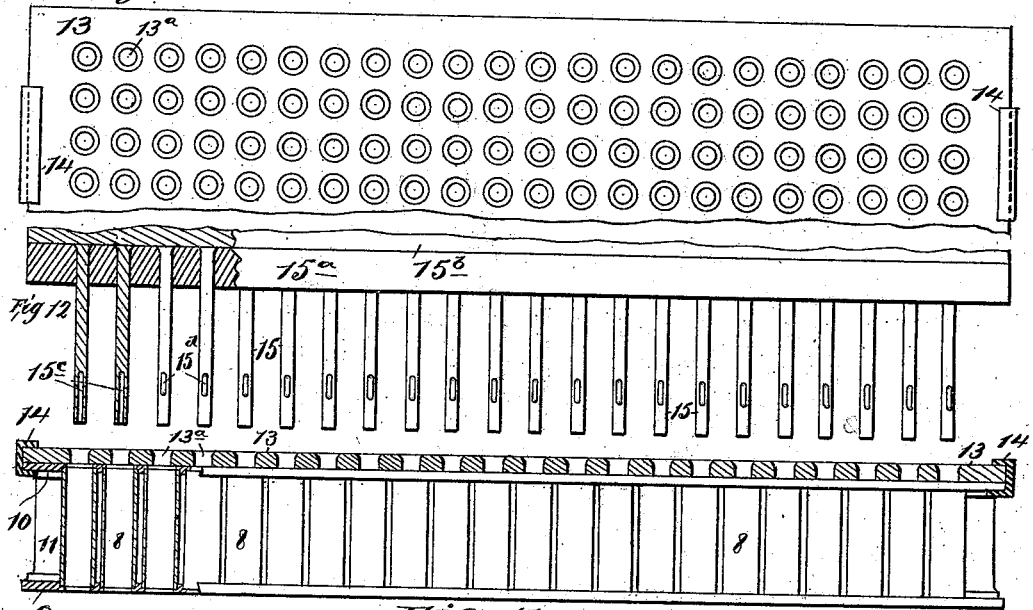
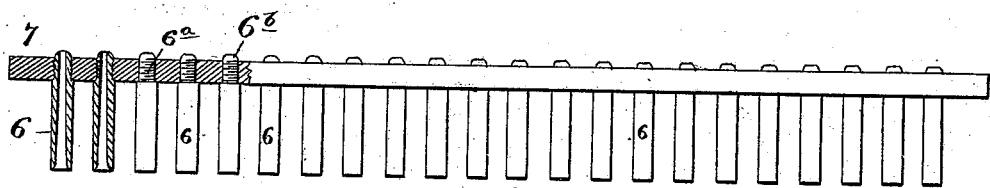
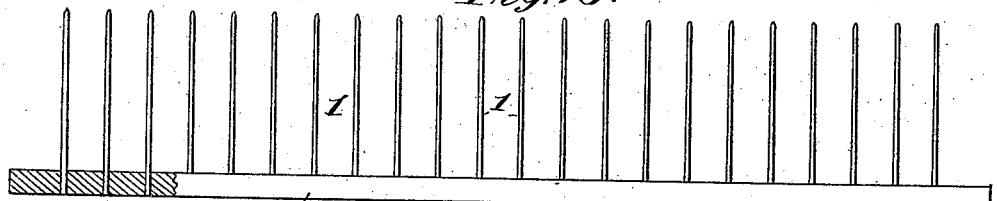
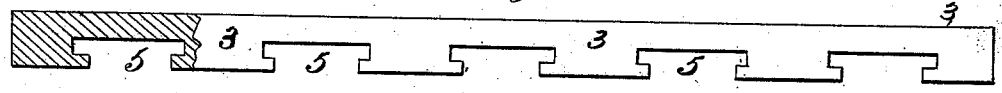
WITNESSES
INVENTOR
Charles B. Bidwell
BY
ATTORNEY No. 691,103. Patented Jan. 14, 1902.
C. B. BIDWELL.
MACHINE FOR LOADING FIRE CRACKERS.
(Application filed May 27, 1898.)
(No Model.) 8 Sheets—Sheet 8.
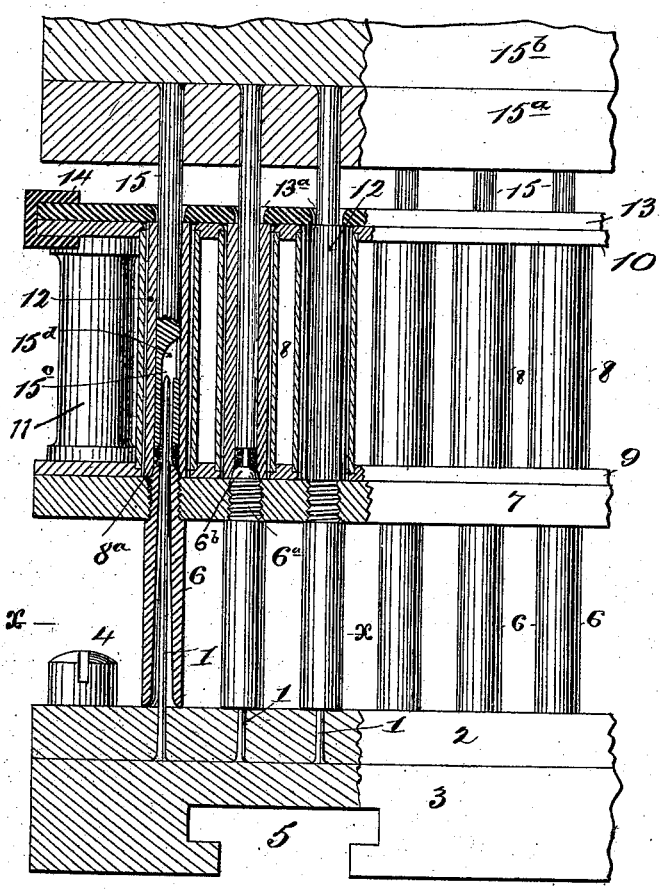
Fig. 15.
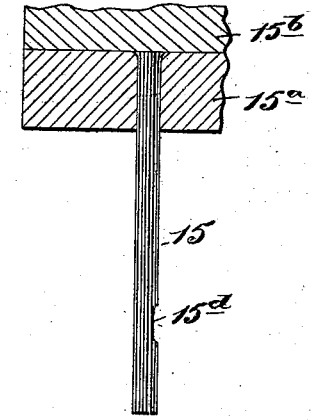
Fig. 14.
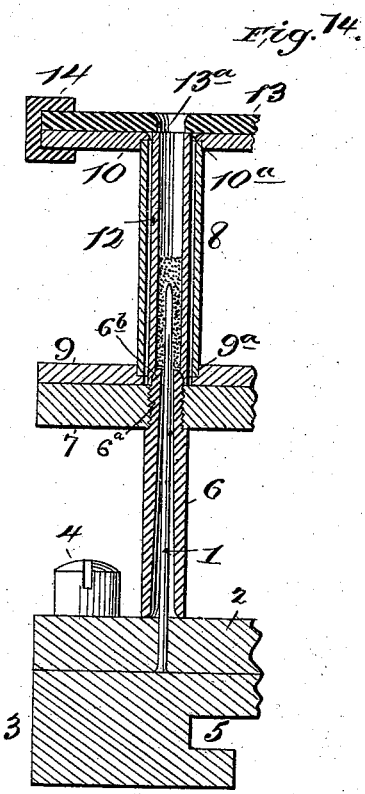
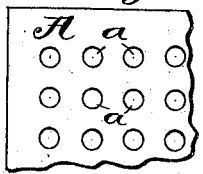
Fig. 16.
Fig. 17.
WITNESSES
C. W. Benjamin
Wm Jacobsen
INVENTOR
Charles B. Bidwell.
BY
Joseph R. Levy
ATTORNEY

UNITED STATES PATENT OFFICE.

CHARLES B. BIDWELL, OF METROPOLITAN, NEW YORK, ASSIGNOR, BY MESNE ASSIGNMENTS, TO THE NORDLINGER-CHARLTON FIREWORKS COMPANY, OF NEW YORK, N. Y., A CORPORATION OF NEW JERSEY.

MACHINE FOR LOADING FIRE-CRACKERS.

SPECIFICATION forming part of Letters Patent No. 691,103, dated January 14, 1902.

Application filed May 27, 1898. Serial No. 681,858. (No model.)

*To all whom it may concern:*

Be it known that I, CHARLES B. BIDWELL, a citizen of the United States, residing at Metropolitan, Queens county, New York State, have invented certain new and useful Improvements in Machines for Loading Fire-Crackers, of which the following is a specification.

My invention relates to improved means for loading fire-crackers, by the manipulations of which the bore of the fire-cracker body is first provided with a plug at one end—say of clay. The stem is then inserted in said bore. A charge of powder is then placed in said bore, and a plug—say of clay—is placed at the outer end of the body to finally close the bore thereof.

The invention comprises a composite die having a series of pins adapted to pass into the end of a fire-cracker body, a support for the pins, a series of tubes adapted to pass over and receive said pins and to permit the passage through them of fire-cracker stems, a support for said tubes, a series of tubes adapted to receive fire-cracker bodies, supports for said tubes, means for holding them in line with said pins, and means for depositing charges of clay and of powder into the fire-cracker bodies, and these parts of the composite die are so arranged as to be manipulated in proper manner for loading the fire-crackers. By preference the pins and tubes just mentioned are arranged in a series of any convenient number and order, so that a large quantity of fire-crackers can be loaded at substantially one operation. Means are provided for holding the various parts of the composite die together and for enabling said die to be taken apart during manipulation.

The invention also consists in a machine comprising a frame, a table adapted to receive and hold the composite die containing fire-cracker bodies, a series of rammers or plungers adapted to pass into the fire-cracker bodies to compress the material therein, and means for causing said rammers to compress said material.

The invention also consists in a machine of the character described having a table provided with means for holding the composite die, a series of pins adapted to act upon said die to separate the parts of the same, and means for operating said pins.

The invention also consists in the novel details of improvement and the combinations of parts, that will be more fully hereinafter set forth, and then pointed out in the claims.

Reference is to be had to the accompanying drawings, forming part hereof, wherein—

Figure 2:
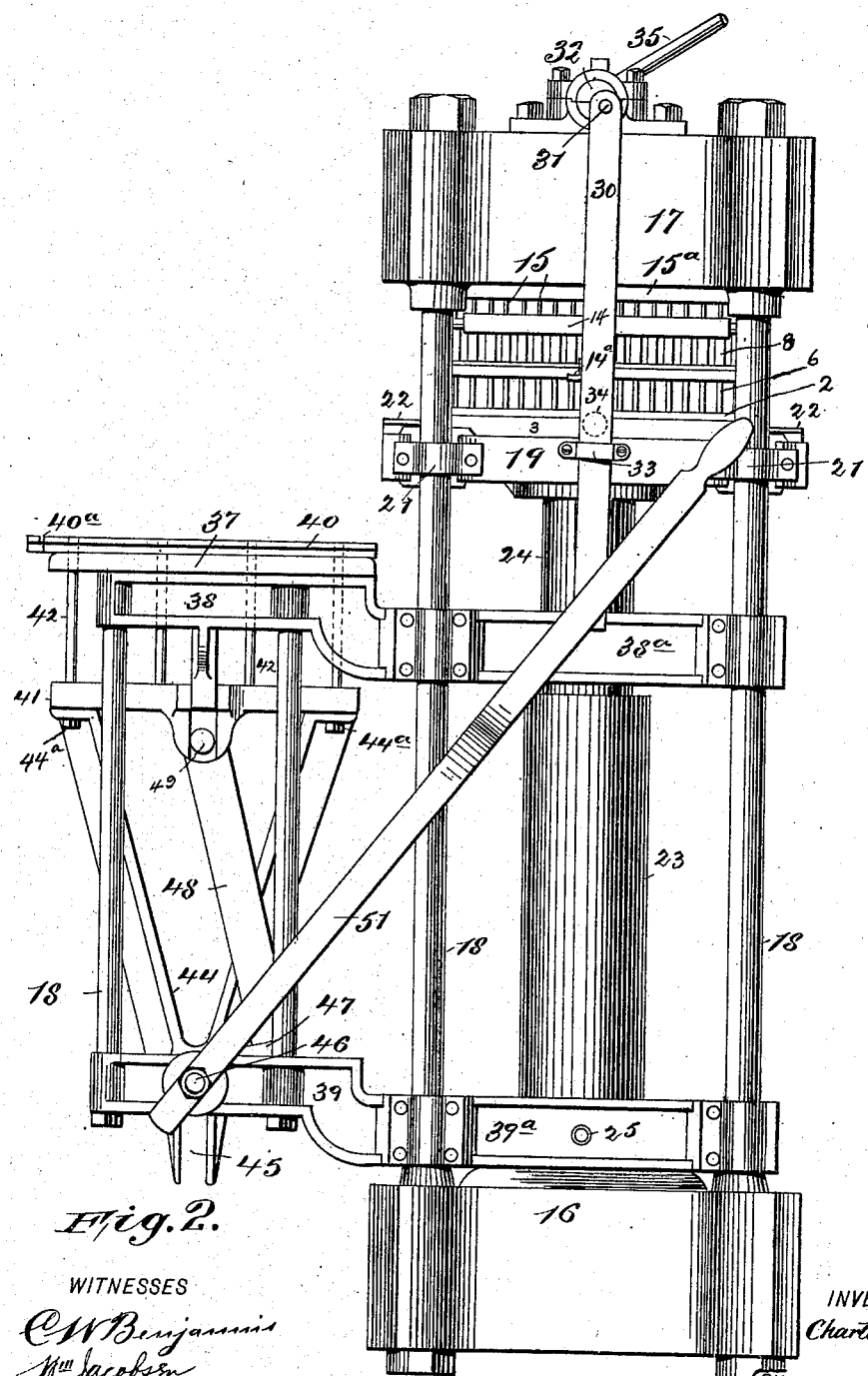
Figure 3:
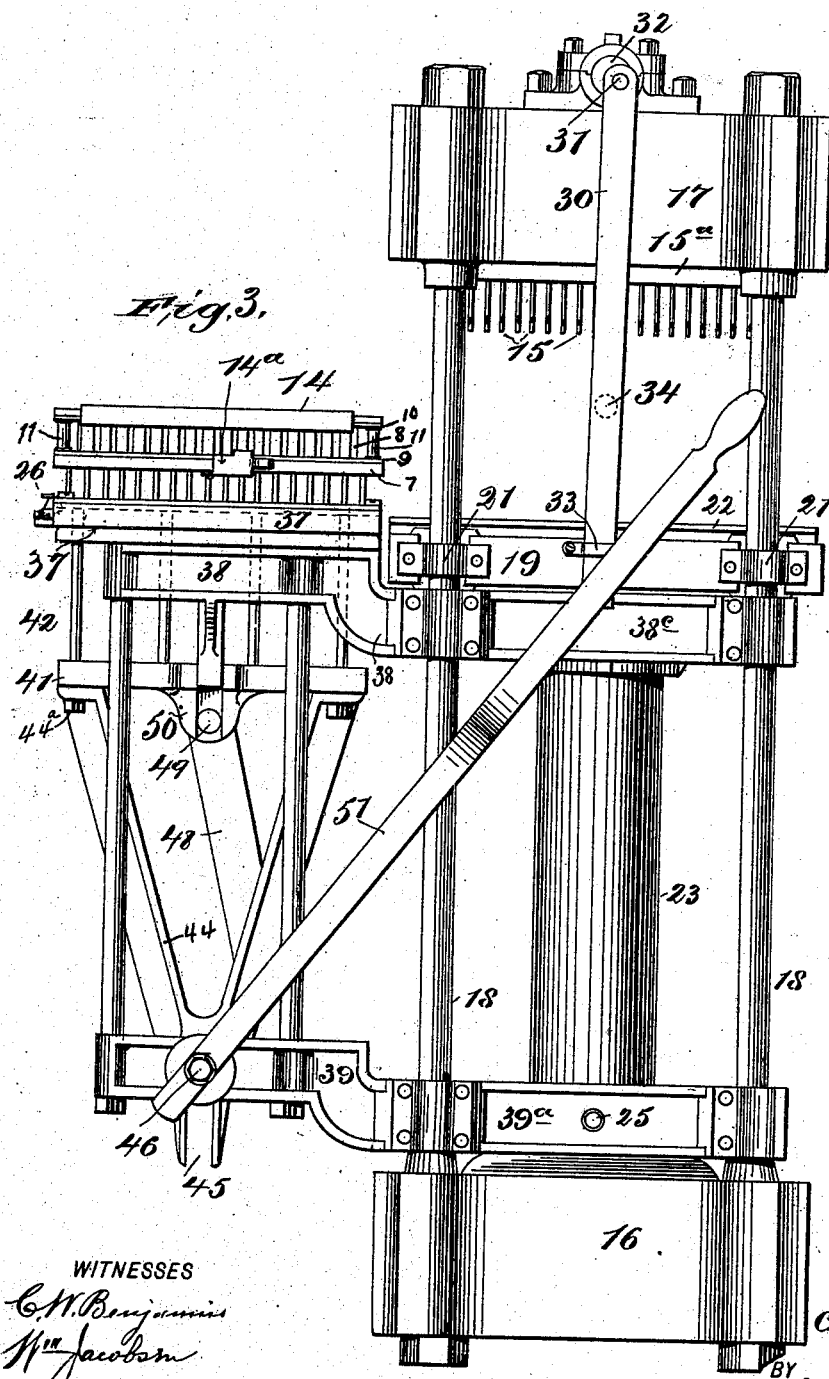
Figure 4:
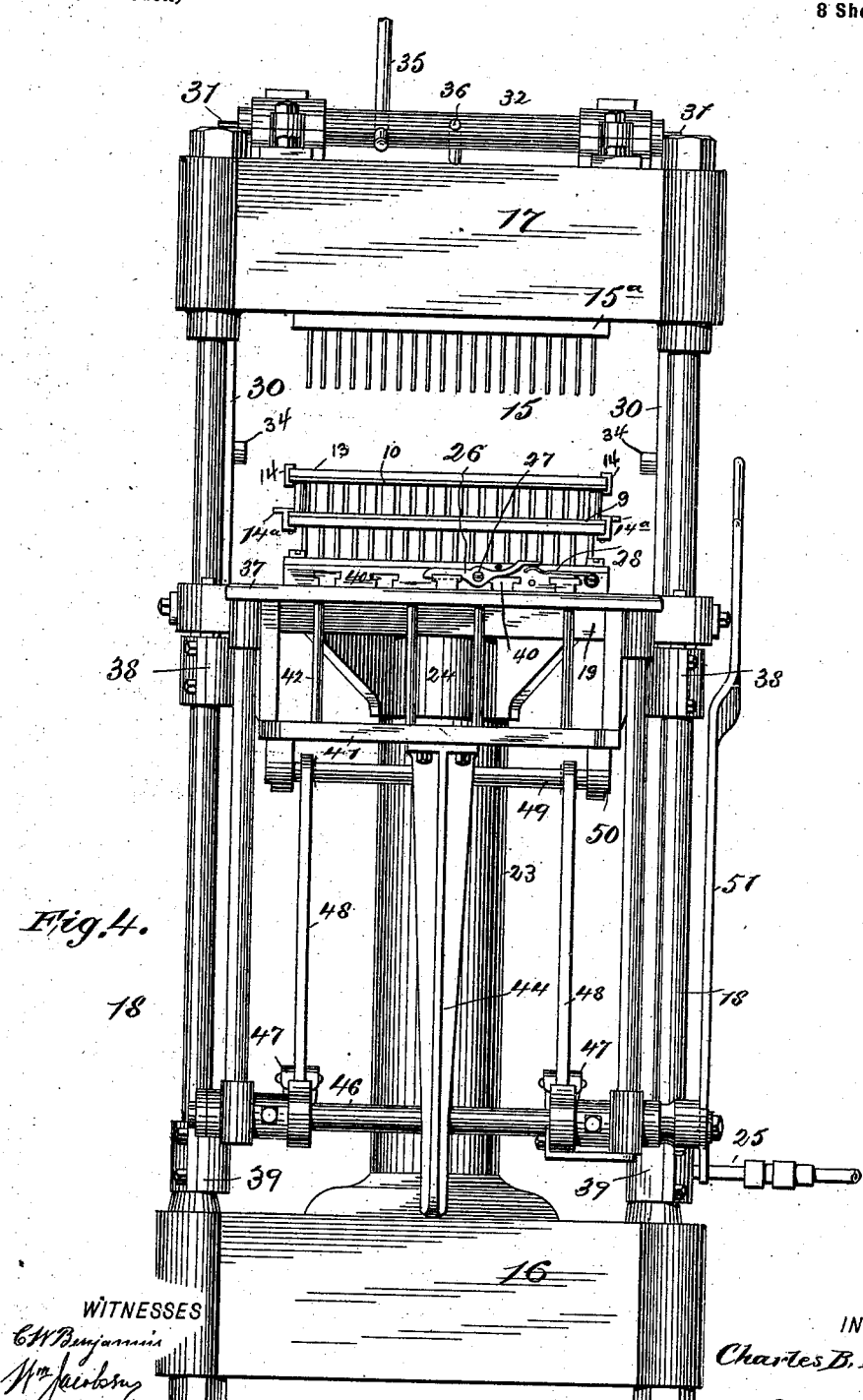
Figure 5:
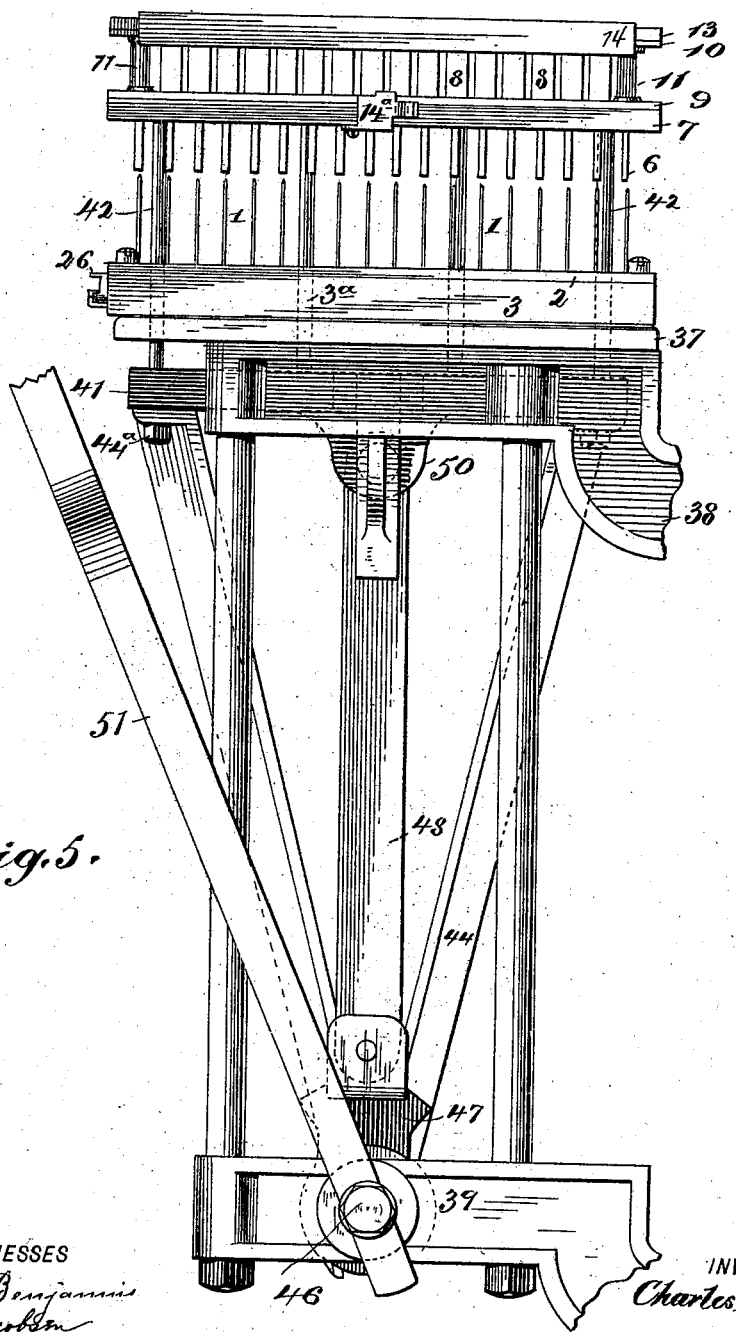
Figure 6:
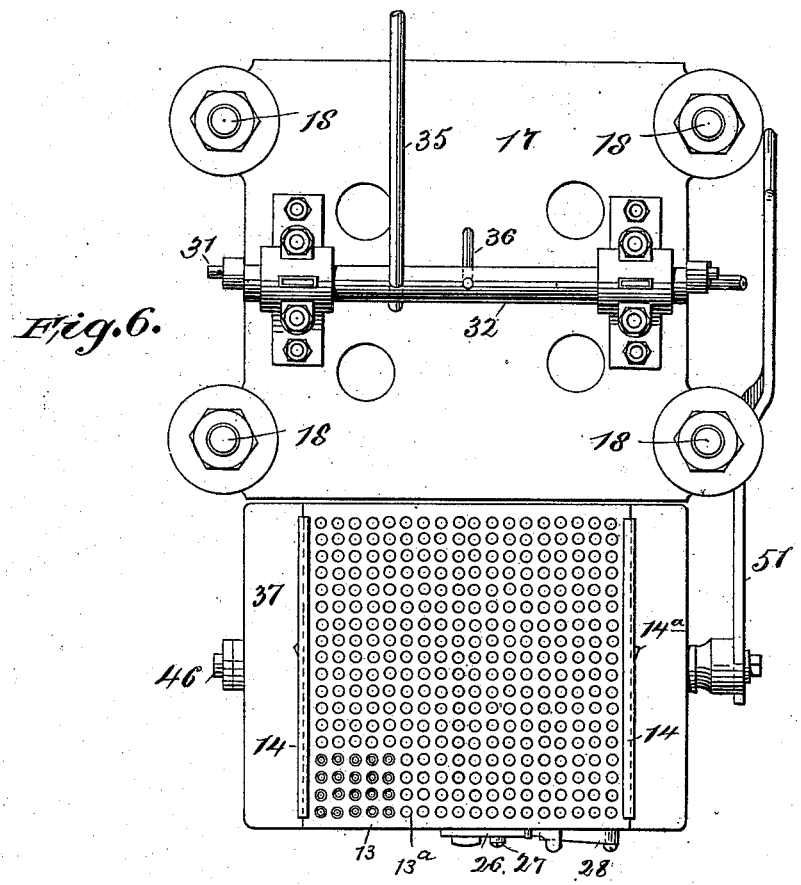
Figure 7:
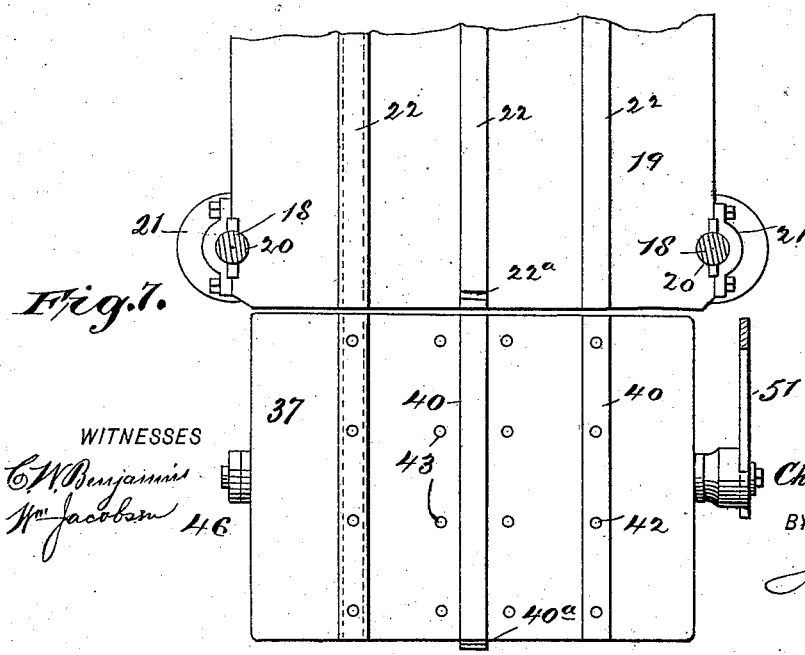

Figure 1 is a side elevation of a machine embodying my improvements, showing the fire-cracker-loading dies in position to have the charges rammed. Fig. 2 is a similar view showing the machine in the act of ramming the charges in the fire-cracker. Fig. 3 is a view corresponding to Fig. 1, showing the fire-cracker-loading dies in position to be separated. Fig. 4 is a front elevation thereof. Fig. 5 is a detail side elevation of the front portion of the machine, showing the dies as being separated. Fig. 6 is a plan view of the machine with the dies in the position shown in Fig. 3. Fig. 7 is a detail plan view on the line 7 7 in Fig. 1 of the two tables of the machine. Fig. 8 is a partly-broken side view of one portion of the composite die used in loading the fire-crackers. Figs. 9, 10, and 11 are similar views of different portions of said die. Fig. 12 is a partly-broken side view of the rammers that are carried by the machine. Fig. 13 is a plan view of Fig. 11. Fig. 14 is an enlarged detail sectional view showing the arrangement of the parts in position to have a clay plug rammed in the fire-cracker body. Fig. 15 is an enlarged detail sectional view of the composite die and the rammers in the act of forming the plug in the fire-cracker bodies. Fig. 16 is a section on the line $x$ $x$ in Fig. 15, and Fig. 17 is a detail of an apertured plate used in loading the fire-crackers.

In the accompanying drawings, in which similar numerals of reference indicate corresponding parts in the several views, 1 indicates pins which are arranged in a series of any suitable number and order and are shown projecting parallel with each other from a plate 2. 3 is another plate, to which the plate 2 is to be secured in any suitable manner, as by screws 4. The object in using two plates 2 and 3 and securing them together is for convenience in manufacture and so that the heads of the pins 1 may have an abutment to rest against. The plate 3 at the bottom is shown provided with a series of parallel T-shaped grooves 5 to receive ways on the bed of the machine (to be described hereinafter) for properly holding the composite die.

At 6 is a series of tubes that are shown carried by a plate 7 and arranged in number and order corresponding to the pins 1, and they are adapted to fit over the latter, as shown in Figs. 14, 15, and 16. By preference the bores in the tubes 6 are tapered from their lower ends upwardly toward the plate 7, and these tubes are shown provided with screw-threads 6ª, that screw into corresponding threads in apertures in the plates 7, whereby said tubes are firmly yet detachably connected with said plate. The ends 6ᵇ of the tubes 6 are shown projecting through the plate 7, which ends are shown rounded or semispherical.

At 8 is a series of tubes arranged in the same order and number as the pins 1 and tubes 6, and they are shown held between two plates 9 10, which have apertures alined with said tubes. The apertures in the plates 9 10 are shown counterbored at 9ª 10ª to receive the tubes 8, so that the ends of said tubes rest against abutments, and said plates 9 10 are firmly held upon said tubes, so that the parts 8 9 10 form a rigid structure.

I have shown pedestals 11 located between the plates 9 10, which are preferably placed at the corners of said plates, and the plates may be screwed thereto for holding them together, or said plate may be connected in any other suitable manner. The apertures in the plates 9 10 are arranged in the same order and number as the tubes 6, so that when said parts are fitted together either plate 9 or 10 may rest upon the plate 7, and the ends 6ᵇ of the tubes 6 will enter the tubes 8, as will also the pins 1. (See Figs. 14 and 15.)

The tubes 8 are adapted to receive the firecracker bodies 12 that are to be loaded, and the apertures in the plates 9 10 are of such size as to permit the fire-cracker bodies 12 to pass through, and, as shown in Figs. 14 and 15, the fire-cracker body 12 will receive the end 6ᵇ of the tube 6.

At 13 is a plate having a series of apertures 13ª arranged in the same order and number as the tubes 8 and adapted to rest upon the plate 10, so that the apertures 13ª may aline with the tubes 8. By preference the apertures 13ª are flared at one end, as shown in Figs. 14 and 15.

Means are provided for firmly yet detachably holding the plates 10 and 13 together, the arrangement I have shown consisting of trough-like clamps 14, that are adapted to be placed against the edges of said plates to hold and to release them. Means are likewise provided for rigidly uniting the plates 7 and 9, which preferably consist of trough-like clamps 14ª, pivoted upon the plate 7 and adapted to swing outwardly and inwardly for the same purpose as the clamps 14. By means of these clamps the plates 7, 9, 10, and 13 can be readily connected and disconnected for purposes of manipulation. The composite die so organized is adapted to be placed in the machine or press and to be brought in line with rammers or plungers 15, which are adapted to enter the tubes 8 to press material placed therein.

The machine I have shown for the purpose is arranged as follows: 16 is a base, and 17 is a head, that are shown connected by four posts 18, which may be secured to said base and head in any suitable manner. The parts 16 17 18 constitute a frame; but of course the frame may be otherwise arranged, if desired.

19 is an elevating-table adapted to receive upon it the composite die before described, and said table is shown guided by the posts 18 to have vertical movement, for which purpose the table 19 is shown provided with recesses 20, Fig. 7, to receive the posts 18, and with straps 21, that pass around said posts and are screwed or bolted to the table 19.

The table 19 is provided with means for firmly yet detachably holding the composite die, for which purpose said table is shown provided with ways 22, which are in the form of T-bars corresponding to and adapted to receive the T-grooves 5 in the bottom of plate 3 of said die.

Means are provided for raising and lowering the table 19, and for this purpose I have shown a hydraulic jack consisting of a cylinder 23 and plunger 24, the cylinder 23 being shown secured to the base 16 and the plunger 24 to the table 19, and 25 is the inlet for the cylinder 23, which may be connected with a pump in any well-known manner. The table 19 is directly beneath the rammers 15, and these rammers are shown projecting from a plate 15ª, that lies beneath an abutment-plate 15ᵇ, (see Fig. 12,) which plates are secured to the head 17. The relation of the parts is such that when the composite die is placed upon table 19 in proper position and said table is elevated the rammers will pass into the tubes 8 to act therein, as hereinafter explained.

Means are provided for locking the composite die in proper position upon the table 19, and for this purpose the plate 3 at one side is provided with a latch 26, which is pivoted to said plate at 27, and one arm of said latch is acted upon by a spring 28, carried by plate 3, to cause the opposite arm to enter a groove 22ª in one of the ways 22. (See Figs. 4 and 7.) Thus when the composite die is placed upon the table 19 and the ways 22 enter the grooves 5 in the plate 3 said die is pushed along said ways until the latch 26 enters the groove 22ª, whereupon said die will be locked in proper position to enable the tubes 8 to receive the rammers 15.

When the table 19 is elevated to cause the rammers to act upon the material within the tubes 8 of the composite die, it may happen that the die will not be properly released from said rammers to descend with the table 19, and for the purpose of disconnecting said die from said rammers I have provided a rod 30, that depends from an eccentric-pin 31, carried by a rock-shaft 32, that is journaled in suitable bearings upon the head 17, there being by preference two of such rods located one at each side of the machine. The lower ends of the rods 30 are shown guided in straps 33, carried by the table 19, and said rods also carry studs 34, that project inwardly over the corresponding sides of the table 19. (See Fig. 4.) At 35 is a handle secured to the shaft 32, whereby the same may be rocked, and 36 is a pin carried by said shaft and adapted to engage the head 17 to limit the reverse movement of said shaft. (See Fig. 6.) With this arrangement when the table is to be elevated the shaft 32 is so rocked that the studs 34 will be raised, and when it is desired to have the table 19 descend the shaft 32 is rocked to press the rods 30 down, whereupon the studs 34 will act upon the table 19 to force the same downwardly, and as the composite die is secured to said table said die will be stripped from the rammers or plungers 15. As the rammers or plungers 15 are to act upon loose material within the fire-cracker bodies 12 and as the pins 1 are located within the fire-cracker body during such operation, the rammers or plungers 15 are provided with longitudinal bores 15$^c$ to receive said pins, and as material is liable to enter said bores said rammers are provided with side slits or openings 15$^d$ for the exit of said material. After the composite die has been elevated by the table 19 to have the plungers 15 act within the fire-cracker bodies 12 said die is to have certain of its parts detached for further manipulation, and in order to conveniently separate said parts I provide the frame 16 17 18 with a stationary table 37. The table 37 is shown supported upon brackets 38, that have arms 38$^a$ secured to the posts 18 at opposite sides of the main frame. Beneath the brackets 38 are corresponding brackets 39, having arms 39$^a$ similarly secured to the posts 18. The table 37 is provided with ways 40, similar to the ways 22 and arranged to receive the grooves 5 of the plate 3 in similar manner, and the ways 40 are in line with the ways 22, as shown in Fig. 7, whereby the composite die can be slid along from the table 19 to the table 37 to engage the ways 40. One of the ways 40 has a notch 40$^a$ to receive the latch 26 to hold the composite die in proper position upon table 37.

Beneath the table 37 is a plate 41, from which extend pins 42, that pass through apertures 43 in the table 37, which pins are adapted to engage the plate 7 of the composite die, so as to raise the same and its attached tubes 6, as indicated in Fig. 5, whereby said tubes may be separated from the pins 1. To enable the pins 42 to so act, the plates 2 and 3 have holes, as shown at 3$^a$ in Fig. 16, to permit the passage of the pins 42, as indicated in Fig. 5.

Suitable means may be provided for raising and lowering the plate 41, and the pins 42 act to assist in guiding said plate in its movements.

I have shown the plate 41 as provided with a depending brace 44, that at its lower end has a recess or jaw 45, that is adapted to straddle or receive a horizontal rock-shaft 46, that is journaled in suitable bearings in the brackets 39.

The brace 44 may be secured to the plate 41 in any suitable manner and is shown so secured by screws 44$^a$.

To the rock-shaft 46 are secured crank-arms 47, to which are pivoted links 48, that extend upwardly and are pivotally connected with the bar 49, carried by lugs 50, depending from said plate. To the rock-shaft 46 is connected a lever or crank-arm 51, by which said shaft can be rocked. From this it will be understood that when the arm 51 is swung to the right in Fig. 1 the links 48 will be depressed to draw down the plate 41 and pins 42 and that when it is desired to separate the composite die that is placed upon the table 37 the arm 51 will be swung over to the left, as shown in Fig. 5, whereupon the cranks 47 will raise the links 48, and thus the plate 41 and pins 42 will be elevated, and as these pins impinge upon the plate 7 the composite die will be separated—that is, the parts 6, 7, 8, 9, and 10 will be raised, whereby the upper portion of said die can be removed for further manipulation, the plate 3 remaining upon the table 37, owing to its connection therewith through the ways 40 and grooves 5.

The manner of loading fire-crackers by means of my improvements is as follows: The plates 2 3 are placed upon a suitable support, as a table or bench, with the pins 1 projecting upwardly, and the plate 7 is placed over the same, so that the pins 1 shall pass through the tubes 6, and said tubes will rest upon the plate 2, as shown in Figs. 14 and 15. The plates 9 10 and tubes 8 are then placed over the plate 7, so that the plate 9 will rest upon the plate 7, and the short ends of the tubes 6 will pass into the tubes 8, as shown in said figures, and the clamps 14$^a$ are closed upon the plates 7 9 to hold them firmly together. The fire-cracker bodies 12 are then placed in the tubes 8 so that their bores aline with the tubes 6, whereby the pins 1 also project into said fire-cracker bodies, as shown in said figures. The plate 13 is then placed upon the plate 10 so that the apertures 13$^a$ will aline with the tubes 8 and the fire-cracker bodies, the plate 13 thereby holding said fire-cracker bodies in the tubes 8, and the clamps 14 are applied to the plates 10 and 13 to hold them together. A plate A, having apertures $a$ arranged in the same order and number as the apertures in the plate 13, is then placed upon the plate 13, the thickness of the plate A and the volume of the apertures $a$ being of sufficient dimensions to contain the proper amount of material to be placed in the fire-cracker bodies. The plate A is first placed upon the plate 13 so that its apertures $a$ will be out of line with the apertures $13^a$, whereby the imperforate part of the plate 13 acts as a closure for the bottoms of the apertures $a$. Suitable clay is then placed upon the plate A and filled into all the apertures $a$ thereof until they are full, and then the clay is brushed off the plate A. The plate A is then adjusted along the plate 13 to bring its apertures $a$ in line with the apertures $13^a$, whereupon the clay in the apertures $a$ will pass into the bores in the corresponding fire-cracker bodies and will surround the respective pins 1 and abut against the ends of the tubes 6, as clearly shown in Fig. 14. The plate A is next removed. The composite die thus organized and charged is next placed upon the table 19 and secured in position beneath the rammers 15, as shown in Fig. 1. The table 19 is then raised, whereupon the composite die is lifted up to the rammers or plungers 15, which thereby enter the fire-cracker bodies and act upon the clay within the same and compress the clay at the lower end of the fire-cracker bodies and around the projecting pins 1. During the action of these rammers the pins 1 enter the bores $15^c$, and any clay that is above and in line with said pins and which enters said bores passes out through the side openings $15^d$. The clay so pressed and compacted in the end of the fire-cracker body forms a plug for the same, with an aperture formed by the pin 1. The table 19 is then lowered, and if the die should stick to the rammers 15 the studs 34 are operated by the shaft 32, as before explained, to dislodge said die from the rammers. The die is then pushed over upon the table 37, and the arm 51 is rocked to the left, whereupon the pins 42 pass through the plates 3 and 2 and act upon plate 7 to raise the upper portion of the die comprising the plates 7, 10, and 13 and the tubes 6 and 8, as shown in Fig. 5. An imperforate plate (not shown) is then placed upon the plate 13, and the parts 6, 7, 8, 9, 10, and 13, which are all still held together, are inverted and placed upon a suitable support, so that the tubes 6 shall extend upwardly. The fuses for the fire-crackers are then passed through the tubes 6, through the apertures left in the clay plugs $8^a$ by the pins 1, and through the fire-cracker bodies and rest upon the said imperforate plate. The plates 6, 7, 8, 9, 10, and 13 are inverted or turned to their original position. The said imperforate plate is then removed and the plate A is placed upon the plate 13 so that its apertures $a$ will be out of line with the apertures $13^a$, as before explained. The apertures $a$ are then filled with the powder or explosive for the fire-cracker charge, and the plate A is then moved over to bring its apertures in line with the apertures $13^a$, whereupon the powder drops into the corresponding fire-cracker bodies 8 and surrounds the fuses therein. The plate A is next moved sidewise and its apertures $a$ again filled with clay, and it is then moved over to cause said clay to pass into the fire-cracker bodies upon the powder or explosive therein, and said clay is then compressed upon the powder to form a closure for the fire-cracker body by any suitable means. The fire-cracker is now completely charged, whereupon the clamps 14 are loosened, the plate 13 is removed, and the die 8 9 10, with the plate 7 attached, may be inverted to cause the fire-crackers to drop away from the tubes 8, or the parts 8 9 10 may be lifted from the plate 7 for the same purpose.

From the foregoing it will be seen that a large quantity of fire-cracker bodies are loaded and charged at substantially one operation, whereby the cost of charging fire-crackers is greatly reduced.

I do not limit my invention to the precise details of construction shown and described, as they may be varied without departing from the spirit thereof.

Having now described my invention, what I claim is—

1. A die comprising a plurality of plates, a plurality of pins projecting from one of said plates, a plurality of tubes opening through one plate and adapted to receive said pins, and a plurality of tubes connecting two other plates and adapted to aline with and to receive said pins, substantially as described.

2. A die comprising a plurality of plates, a plurality of pins projecting from one plate, a plurality of tubes projecting from and opening through another plate and adapted to receive said pins and to rest upon the plate carrying said pins, and a plurality of tubes carried by two other plates and adapted to receive the protruding ends of said tubes and said pins, and adapted to rest upon the plate carrying the first-mentioned tubes, the second-mentioned tubes being adapted to receive fire-cracker bodies, substantially as described.

3. A die comprising a plurality of plates, a plurality of pins projecting from one plate, a plurality of tubes projecting from another plate and adapted to receive said pins, a plurality of tubes connected with two other plates and adapted to aline with and to receive said pins, and an apertured plate adapted to have its apertures alined with the bores in the second-mentioned tubes, substantially as described.

4. A die comprising a plurality of plates, a plurality of pins carried by one plate, a plurality of tubes carried by another plate, said tubes being adapted to fit over and receive said pins, said tubes projecting at both ends through the said plate, a plurality of tubes carried by two other plates and adapted to receive said pins and also to receive fire-cracker bodies, and means for clamping the plates carrying said tubes together, substantially as described.

5. A die comprising a plurality of plates, a plurality of pins carried by one plate, a plurality of tubes carried by another plate, said tubes being adapted to fit over and receive said pins, said tubes projecting at both ends through the said plate, a plurality of tubes carried by two other plates and adapted to receive said pins and also to receive fire-cracker bodies, means for clamping the plates carrying said tubes together, a plate having perforations to aline with the second-mentioned tubes, and means for clamping said plate to one of the plates connected with the second-mentioned tubes, substantially as described.

6. A die comprising a plurality of plates, a plurality of pins carried by one plate, a plurality of tubes carried by another plate, said tubes opening through said plate and having their protruding ends at one side of the plate rounded, and a plurality of tubes carried by two other plates, and adapted to receive said protruding ends of the first-mentioned tubes and said pins, substantially as described.

7. A die comprising a plurality of plates, a plurality of pins carried by one plate, a plurality of tubes carried by and opening through another plate and adapted to receive said pins, the bores of said tubes being tapered from their outer ends inwardly, and a plurality of tubes carried by two other plates and adapted to aline with the first-mentioned tubes and to receive said pins, substantially as described.

8. A die comprising a plurality of plates, a plurality of pins projecting therefrom, a plurality of tubes carried by and opening through another plate, a plurality of tubes connected with two other plates, said plates having countersunk apertures in which the ends of said tubes fit, and means for holding said two plates together upon said tubes, substantially as described.

9. A die comprising a plurality of plates, a plurality of pins projecting therefrom, a plurality of tubes carried by and opening through another plate, a plurality of tubes connected with two other plates, said plates having countersunk apertures in which the ends of said tubes fit, and means for holding said two plates together upon said tubes, one plate having a plurality of holes adapted to aline with the second-mentioned tubes, and means for clamping corresponding pairs of said plates together, substantially as described.

10. A die comprising a plurality of plates, a plurality of pins projecting from one plate, a plurality of tubes projecting from and opening through another plate, and a plurality of tubes carried by two other plates and adapted to receive said pins, combined with a plurality of rammers or plungers adapted to enter the second-mentioned tubes, substantially as described.

11. A die comprising a plurality of plates, a plurality of pins projecting from one plate, a plurality of tubes projecting from and opening through another plate, and a plurality of tubes carried by two other plates and adapted to receive said pins, combined with a plurality of rammers or plungers to enter the second-mentioned tubes and having bores at their operative ends to receive said pins, substantially as described.

12. A die comprising a plurality of plates, a plurality of pins projecting from one plate, a plurality of tubes projecting from and opening through another plate, a plurality of tubes carried by two other plates and adapted to receive said pins, combined with a plurality of rammers or plungers to enter the second-mentioned tubes and having bores at their operative ends to receive said pins, said rammers or plungers each having a side opening leading to its bore, substantially as described.

13. A die comprising a plurality of plates, a plurality of pins carried by one plate, a plurality of tubes carried by and opening through one plate, and a plurality of tubes carried by two other plates, the plate that carries said pins having means for attaching it to the table or bed, substantially as described.

14. A die comprising a plurality of plates, a plurality of pins carried by one plate, a plurality of tubes carried by and opening through one plate, a plurality of tubes carried by two other plates, the plate that carries said pins having one or more grooves that are wider at the top than at the bottom and adapted to receive ways, substantially as described.

15. In a machine of the character described, the combination of a frame, a reciprocative table adapted to carry a laterally-movable and detachable die, a plurality of rammers or plungers supported above said table to act upon the die means for independently supporting and raising and lowering the die in coöperative relationship with the table and further means for raising and lowering the table to and from the rammers, substantially as described.

16. In a machine of the character described the combination of a frame, a reciprocative table adapted to receive a die, a plurality of rammers or plungers above said table, a rock-shaft having eccentric pins, and rods depending from said pins and having studs to act upon said table to dislodge the rammers from the die, substantially as described.

17. The combination of a frame, a table carried thereby, means for holding a die upon said table, a plurality of pins adapted to pass through said die, a plate carrying said pins, a shaft, a bracket carried by said plate and adapted to be guided by said shaft, a crank carried by said shaft, a link connecting said plate with said crank, and means for operating said shaft, substantially as described.

18. The combination of a frame, a table carried thereby, means for holding a die upon said table, a plurality of pins adapted to pass through said table, a plate carrying said pins, a bracket carried by said plate and having a recess or bore, a shaft to enter said recess or bore, a crank carried by said shaft, a link connecting said crank with said plate, and means for operating said shaft, substantially as described.

Signed in the city, county, and State of New York this 26th day of May, 1898.

CHARLES B. BIDWELL.

Witnesses:
WM. JACOBSON,
S. BEATRICE KUHM.